July 28, 1936. H. L. PALMER 2,049,312
WELDING APPARATUS
Filed Aug. 30, 1934
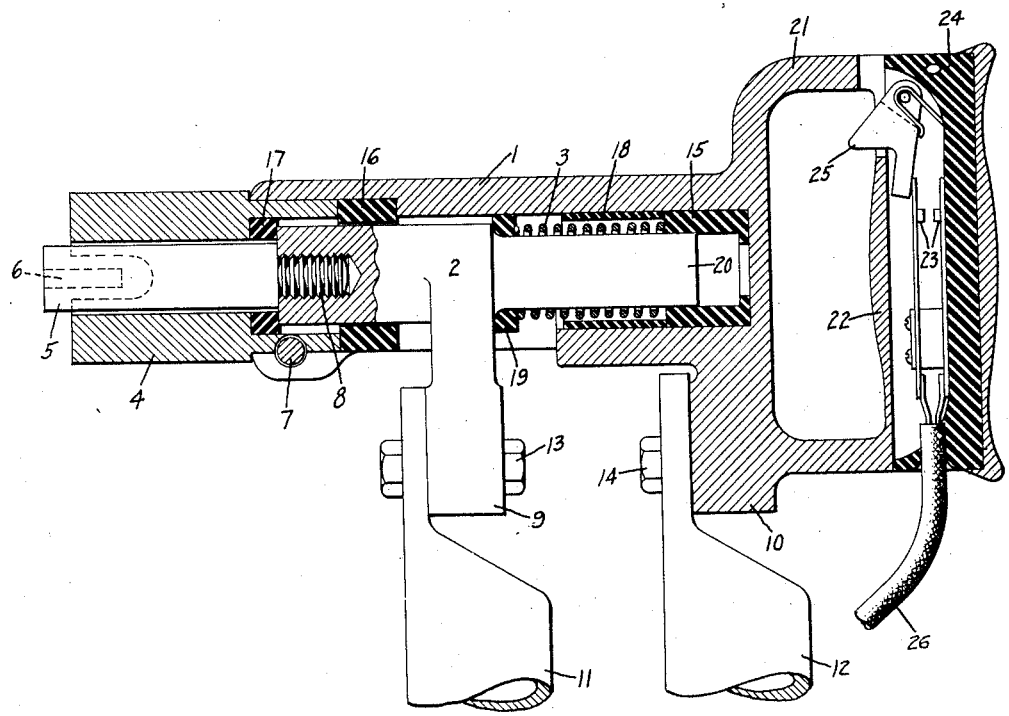
Inventor:
Harry L. Palmer,
by Harry E. Dunham
His Attorney.

Patented July 28, 1936

2,049,312

UNITED STATES PATENT OFFICE 2,049,312

WELDING APPARATUS

Harry L. Palmer, Scotia, N. Y., assignor to General Electric Company, a corporation of New York Application August 30, 1934, Serial No. 742,121

5 Claims. (Cl. 219—4)

My invention relates to electric welding apparatus. More particularly my invention relates to welding apparatus suitable for resistance welding small metallic parts to other pieces of metal which may be and often are of much greater dimensions.

In fitting ships or other vessels, it is often desirable to weld to the metallic plates forming part of the ship body studs by means of which pipes, lighting fixtures and the like are secured in place. Likewise in the construction of steel cars it is often desirable to weld to the metallic sheathing or walls of the car means such as ordinary nails for holding insulation or similar materials in place on the walls. In these and like applications my invention will find its greatest application.

It is an object of my invention to provide a welding tool for accomplishing the welding operation above referred to.

A further object of my invention is to provide a welding tool of improved design in which the desired welding pressure is obtained during the welding operation.

Further objects of my invention will become apparent from a consideration of the following description taken in connection with the accompanying drawing, the single figure of which illustrates one embodiment thereof.

The welding tool illustrated in the drawing is adapted for welding studs to plates. It comprises two relatively movable members 1 and 2 which are biased to a predetermined position relative to one another by a spring 3. The member 1 is provided with a plate engaging member or electrode 4, and the member 2 is provided with a stud holder or electrode 5. The stud holder 5 is provided with a recess 6 within which the stud is inserted prior to the welding operation. The plate engaging member 4 is clamped in the member 1 by means of a bolt 7 and the stud holding member 5 is provided with a threaded stud 8 by means of which it is attached to the member 2. The plate engaging member 4 and the stud holding member 5 can thus be readily removed when they become sufficiently worn through usage to warrant renewal.

The members 1 and 2 are provided with opposed downwardly extending terminal lugs 9 and 10 by means of which the terminals 11 and 12 of the depending welding current conductors are attached thereto. In the arrangement illustrated the terminals 11 and 12 are attached to the lugs 9 and 10 by bolts 13 and 14.

In accordance with my invention these lugs are disposed relatively to one another so that a separating force applied to them acts on the members 1 and 2 in the same direction as the spring 3.

If the arrangement were such that a separating force applied to the lugs 9 and 10 acted in opposition to the spring 3, the operation of the welding tool would be impaired for during welding the reaction on one another by the conductors through which welding current is supplied to the tool is sufficient to compress a spring otherwise suitable for biasing the members 1 and 2 to their desired positions relative to one another. By arranging the parts in accordance with my invention faulty operation resulting from a decrease in welding pressure during welding is completely eliminated since the electromagnetic force resulting from the flow of welding current in the parallel disposed conductors or cables attached to the tool acts on members 1 and 2 in the same direction as the force exerted by the spring 3 and in a direction to force the stud holding member against the plate to which the stud is to be welded.

The members 1 and 2 as well as the stud holder 5 and plate engaging member 4 are made of electrically conducting material and the welding circuit is completed through these members and the parts to be welded. The members 4 and 5 may be made of copper and the members 1 and 2 of a heat treated aluminum. The members 1 and 2 are insulated from one another by means of insulating bushings 15 and 16. Bushing 15 is held in place in the tool by means of the spring 3, and bushing 16 is held in place by means of the bolt 7 which also holds in place the plate engaging member 4. An insulating washer 17 is also employed for insulating members 1 and 2 from one another. This washer also serves as a buffer against which member 2 is held by spring 3. This spring is insulated from member 1 by bushing 18 and rests at one end against a washer 19 supported on a cylindrical extension 20 forming part of the member 2 about which the spring 3 is located.

The member 1 is provided with a handle 21 which may be formed integrally therewith. Within the handle grip 22 there is located a switch 23 which is mounted on an insulating support 24 secured within the handle grip. The switch 23 is operated by a trigger 25 and when closed completes a circuit through control conductors 26, which operate through suitable relays to initiate the flow of welding current. The flow of welding current may be interrupted by timing means functioning independently of the operation of switch 23, or by means operating to interrupt the flow of welding current upon the opening of switch 23 accomplished by the release of trigger 25. Since this, however, forms no part of the present invention and since such systems are well known in the art, no further description with regard thereto will be given here.

The welding tool above described is used as follows: The operator inserts a stud or similar article in the recess 6 formed in the member 5 and the tool is forced into engagement with the plate to which the stud is to be welded, until the plate engaging member 4 comes into contact therewith. The operator then depresses the trigger 25 to initiate the flow of welding current. It is to be noted that the electromagnetic forces resulting from the flow of welding current act through the cables attached to members 1 and 2 is in the same direction as the spring 3, and increases the pressure between the parts to be welded over that exerted thereon by the spring 3. The tool is held in engagement with the plate until the welding operation has been completed when by the operation of suitable timing means or by releasing the trigger 25 the flow of welding current is interrupted. In some cases it may be desirable to hold the tool in operating position until the weld has cooled slightly.

The particular apparatus described is but one embodiment of my invention which may be applied to various forms of welding apparatus in which the electromagnetic repulsive effect of the means for supplying welding current to relatively movable members acts on these members in the same direction as the means employed for exerting welding pressure between the parts to be welded. Various embodiments will occur to those skilled in the art, and I desire to cover all such modifications and variations as fall within the scope of my invention which is set forth in the accompanying claims.

What I claim as new and desire to secure by Letters Patent of the United States, is:—

1. Welding apparatus comprising relatively movable members adapted to engage the same side of a work part, means reacting against said members for biasing them to a predetermined position relative to one another, and means for supplying welding current to said members including parallel disposed conductors located relative to one another and said members so that the flow of welding current therethrough generates an electromagnetic force acting on said members in the same direction as said biasing means.

2. Welding apparatus comprising two relatively movable work engaging members, means for biasing one of said members into engagement with a work part when said other member is held in engagement with said work part, and means for supplying welding current to said members including parallel disposed conductors located relative to one another and said members so that the flow of welding current therethrough generates an electromagnetic force acting on said members in the same direction as said biasing means.

3. Welding apparatus comprising two relatively movable work engaging members, resilient means for biasing one of said members into engagement with a work part when said other member is held in engagement with said work part, and means for supplying welding current to said members including parallel disposed conductors located relative to one another and said members so that the flow of welding current therethrough generates an electromagnetic force acting on said members in the same direction as said biasing means.

4. Welding apparatus comprising two relatively movable work engaging members, means for biasing one of said members into engagement with a work part when said other member is held in engagement with said work part, and a terminal lug attached to each of said members said terminal lugs being disposed relatively to one another for connection to parallel disposed conductors so that a separating force applied to said lugs by the electromagnetic forces resulting from the flow of welding current through said conductors acts on said members in the same direction as said biasing means.

5. Apparatus for welding studs to plates comprising a stud holding member, a plate engaging member, means acting against said stud holding member for biasing said stud into engagement with a plate when said plate engaging member is held against said plate, a downwardly extending terminal lug attached to said stud holding member, and a second downwardly extending terminal lug attached to said plate engaging member, said lugs being disposed relatively to one another so that a separating force applied to said lugs by the depending conductors attached thereto upon the flow of welding current acts on said members in the same direction as said biasing means.

HARRY L. PALMER.